United States Patent [19]

Watanabe et al.

[11] Patent Number: 4,617,367
[45] Date of Patent: Oct. 14, 1986

[54] METHYL METHACRYLATE SYRUP COMPOSITION

[75] Inventors: Katsushi Watanabe, Kamakura; Takafumi Kageyama; Taisaku Kano, both of Yokohama; Koichi Hirai, Hatano; Yoshinobu Ichihara, Mobara, all of Japan

[73] Assignee: Mitsui Toatsu Chemicals, Inc., Tokyo, Japan

[21] Appl. No.: 675,568

[22] Filed: Nov. 28, 1984

[51] Int. Cl.$^4$ .......................................... C08F 220/14
[52] U.S. Cl. ................................. 526/273; 525/208; 525/286
[58] Field of Search ................ 526/273; 525/208, 286

[56] References Cited

U.S. PATENT DOCUMENTS

| | | | |
|---|---|---|---|
| 3,297,621 | 1/1967 | Taft | 525/286 |
| 3,652,476 | 3/1972 | Fellers et al. | 526/273 |
| 3,697,619 | 10/1972 | Nagata et al. | 526/273 |
| 3,845,010 | 10/1974 | Labana et al. | 526/273 |
| 4,051,194 | 9/1977 | Ishikawa et al. | 526/273 |

*Primary Examiner*—Harry Wong, Jr.
*Attorney, Agent, or Firm*—Fisher, Christen & Sabol

[57] ABSTRACT

A methyl methacrylate syrup composition comprises an intimate mixture of 1–99 parts by weight of a first polymer-in-monomer syrup (A) and 99–1 parts by weight of a second polymer-in-monomer syrup which can be either ($B_1$) or ($B_2$), wherein the syrups (A), ($B_1$) and ($B_2$) are as follows:

(A) a polymer-in-monomer syrup obtained by copolymerizing a mixture of methyl methacrylate monomer, one or more monomers having reactivity with glycidyl groups and containing at least one ethylenically-unsaturated bond, and one or more of (meth)acrylates, styrene and styrene derivatives;

($B_1$) a polymer-in-monomer syrup obtained by copolymerizing a mixture of one or more monomers containing at least one glycidyl group and at least one ethylenically-unsaturated bond, and one or more monomers selected from the group consisting of methyl methacrylate, (meth)acrylates, styrene and styrene derivatives;

($B_2$) a polymer-in-monomer syrup containing a copolymer obtained by copolymerizing one or more monomers containing at least one glycidyl group and one or more other copolymerizable monomers, having a number average molecular weight of 1,500–50,000 and containing a glycidyl group, in one or more monomers selected from the group consisting of methyl methacrylate and (meth)acrylates, styrene and styrene derivatives.

6 Claims, No Drawings

METHYL METHACRYLATE SYRUP COMPOSITION

TECHNICAL FIELD

This invention relates to a syrup useful for the production of a variety of moldings and making use of methyl methacrylate as a principal component of its starting monomer.

BACKGROUND ART

Syrups making use of methyl methacrylate as a principal component of their starting monomers have been used for molding applications such as plates and boards reinforced with glass fibers, kitchen counter tables, sink cabinets and so on. They have very good properties in weathering resistance, including resistance to yellowing. Under severe use conditions such as immersion in boiling water for a prolonged period of time while being filled with such a filler as glass fibers, siliceous sand, alumina or the like, the resultant moldings were however accompanied by such drawbacks that they underwent whitening, delustering, etc. The present inventors have succeeded in leapingly improving the water resistance under severe conditions by mixing a syrup containing functional groups having reactivity with glycidyl groups and another syrup containing glycidyl groups in a stirrer-equipped tank, and using a catalyst such as benzoyl peroxide, azobisisobutyronitrile, t-butyl peroxypivalate, t-butyl peroxy-2-ethylhexanoate to cause the syrups to undergo radical polymerization while at the same time, allowing an addition reaction to proceed between the glycidyl groups and the functional groups having reactivity with the glycidyl groups.

SUMMARY OF THE INVENTION

This invention provides a methy methacrylate syrup composition comprising an intimate mixture of 1–99 parts by weight of a first polymer-in-monomer syrup (A) and 99−1 parts by weight of a second polymer-in-monomer syrup which can be either ($B_1$) or ($B_2$), the sum of said first syrup (A) and said second syrup ($B_1$) or ($B_2$) being 100 parts by weight, wherein the syrups (A), ($B_1$) and ($B_2$) are as follows:

(A) a polymer-in-monomer syrup obtained by copolymerizing to a polymerization degree of 10–60% a mixture which comprises (a) 5–95 wt.% of methyl methacrylate monomer, (b) 95–1 wt.% of one or more monomers having reactivity with glycidyl groups, containing at least one ethylenically-unsaturated bond, being copolymerizable with methyl methacrylate, and selected from the group consisting of carboxyl-containing monomers, hydroxyl-containing monomers, phosphorous- or phosphoric-containing monomers and amino-containing monomers and (c) 0–94 wt.% of one or more monomers not having reactivity with glycidyl groups, containing at least one ethylenically-unsaturated bond, being copolymerizable with methyl methyacrylate and selected from the group consisting of (meth)acrylates, styrene and styrene derivatives, the sum of said monomers (a), (b) and (c) being 100 wt.%;

($B_1$) a polymer-in-monomer syrup obtained by copolymerizing to a polymerization degree of 10–60% a mixture which comprises (d) 3–97 wt.% of one or more monomers containing at least one glycidyl group and at least one ethylenically-unsaturated bond, being copolymerizable with methyl methacrylate and selected from the group consisting of glycidyl(meth)acrylates, betamethylglycidyl(meth)acrylates, N-glycidyl(meth)acrylic amides, (meth)acrylic acid addition products of an epoxy resin composed of a polyhydric phenol and an epihalohydrin and allyl glycidyl either and (e) 97–3 wt.% of one or more monomers selected from the group consisting of methyl methacrylate and the monomers defined in subparagraph (c) above, the sum of said monomers (d) and (e) being 100 wt.%;

($B_2$) a polymer-in-monomer syrup containing (f) 5–95 wt.% of a copolymer obtained by copolymerizing 3–97 wt.% of one or more monomers containing at least one glycidyl group and selected from the group consisting of glycidyl(meth)acrylates, beta-methylgylcidyl(meth)acrylates and allyl glycidyl ether and 97–3 wt.% of one or more other copolymerizable monomers selected from the group consisting of (meth)acrylates, fumarates, maleates, styrene, alpha-methylstryrene, (meth)acrylic amide and (meth)acrylonitrile, having a number average molecular weight of 1,500–50,000 and containing a glycidyl group, in (g) 95–5 wt.% of one or more monomers selected from the group consisting of methyl methacrylate and the monomers defined in subparagraph (c) above.

PREFERRED EMBODIMENTS OF THE INVENTION

The invention will hereinafter be described in detail.

In the syrup (A), the methyl methacrylate monomer (a) is required to be present in an amount of 5–95 wt.%. If its content should be less than 5 wt.%, the storage stability of a syrup composition resulted after the mixing of the syrup (A) with the syrup ($B_1$) or syrup ($B_2$) will be poor and the viscosity of the syrup composition will increase extremely rapidly along the passage of time during its storage. On the other hand, any contents of the methyl methacrylate monomer (a) in excess of 95 wt.% will result in moldings having poor water resistance.

On the other hand, the monomer (b) which has reactivity with glycidyl groups, contains at least one ethylenically-unsaturated bond and is copolymerizable with methyl methacrylate should be contained in an amount of 1 wt.% or more, whereas the monomer (c) which does not have reactivity with glycidyl groups, contains at least one ethylenically-unsaturated bond and is copolymerizable with methyl methacrylate should be present in an amount of 94 wt.% or less.

If either the former monomer (b) should be less than 1 wt.% or the latter monomer (c) should exceed 94 wt.%, the resulting molding will have poor water resistance.

As examples of the monomer (b) which is used in the syrup (A) and has reactivity with glycidyl groups, contains at least one ethylenically-unsaturated bond and is copolymerizable with methyl methacrylate, may be mentioned, for example, carboxyl-containing monomers such as methacrylic acid, maleic anhydride, maleic acid, fumaric acid, acrylic acid; hydroxyl-containing monomers such as 2-hydroxyethyl methacrylate, 2-hydroxypropyl methacrylate, neopentylglycol monomethacrylate, trimethylolpropane monomethacrylate, trimethylolpropane dimethacrylate, polyethyleneglycol monomethacrylate, 2-hydroxyethyl acrylate, 2-hydroxpropyl acrylate, neopentylglycol monoacrylate, trimethylolpropane monoacrylate, trimethylolpropane diacrylate, polyethyleneglycol monoacrylate; phosphorous- or phosphoric-containing monomers such as the phosphoric ester of 2-hydroxyethyl methacrylate, the phosphorous ester of 2-hydroxyethyl methacrylate, the phosphoric ester of 2-hydroxyethyl acrylate, the phosphorous ester of 2-hydroxyethyl acrylate; amino-containing monomers such as N-methyl-aminoethyl methacrylate, 4-N-methylaminocyclohexyl methacrylate, N,N-dimethylaminoethyl methacrylate, methacrylic amide, crotonic amide, vinyl amine, N-ethylvinyl amine, allyl amine, diallyl amine, N-methylallyl amine, N-methylaminoethyl acrylate, 4-N-methylaminocyclohexyl acrylate, N,N-dimethylaminoethyl acrylate, acrylic amide. These monomers may be used either singly or in combination. Among the monomers mentioned above by way of example, carboxyl-containing monomers such as methacrylic acid, acrylic acid are particularly preferred.

On the other hand, illustrative of the monomer (c) which is used in the syrup (A) in this invention and does not have reactivity with glycidyl groups, contains at least one ethylenically-unsaturated bond and is copolymerizable with methyl methacrylate include, for example, such monomers as ethyl methacrylate, butyl methacrylate, 2-ethylhexyl methacrylate, lauryl methacrylate, vinyl acetate, styrene, 2-methylstyrene, chlorostyrene, t-butylstyrene, Vinyl Versatate (trade mark), ethyleneglycol dimethacrylate, polyethyleneglycol dimethacrylate, neopentylglycol dimethacrylate, trimethylolpropane trimethacrylate, divinyl benzene, triallyl isocyanurate, methyl acrylate, ethyl acrylate, butyl acrylate, 2-ethylhexyl acrylate, lauryl acrylate, ethyleneglycol diacrylate, polyethyleneglycol diacrylate, neopentylglycol diacrylate, trimethylolpropane triacrylate, butyl fumarate.

The syrup (A) can be obtained by stirring and mixing a mixture of the above-mentioned monomers in a reaction tank equipped with a stirring device and heating and cooling facilities, and reacting the mixture at a temperature of from 50° C. to 110° C., for 3–24 hours and in the presence of a catalyst such as azobisisobutyronitrile, benzoyl peroxide, t-butyl peroxyneodecanoate, t-butyl peroxypivalate, t-butyl peroxy-2-ethylhexanoate and a chain transfer agent such as t-dodecyl mercaptan, n-dodecyl mercaptan, thioglycolic acid, mercaptoethanol so as to copolymerize it to a polymerization degree of 10–60%. If the polymerization degree should be lower than 10%, the resulting molding will have poor water resistance. If it should be greater than 60% on the other hand, the viscosity of the resulting syrup will be so high that its workability will be deteriorated to a significant extent.

The syrup ($B_1$) is required to use the monomer (d), which has at least one glycidyl group, contains at least one ethylenically-unsaturated bond and is copolymerizable with methyl methacrylate, in an amount of 3–97 wt.%. Any amounts smaller than 3 wt.% will lead to moldings having poor water resistance, whereas any monomer (d) amount greater than 97 wt.% will, upon mixing with the syrup (A), result in syrup compositions having such poor storage stability that their viscosities will increase excessively along the passage of time during their storage.

The same monomers as those mentioned above in detail as the exemplary monomers (c) in the syrup (A) may also be mentioned as examples of the monomer which is used in the syrup ($B_1$) in the present invention and does not have reactivity with glycidyl groups, contains at least one ethylenically-unsaturated bond and is copolymerizable with methyl methacrylate.

As examples of the monomer (d) which is used in the syrup ($B_1$) in the present invention and has one or more glycidyl groups, contains at least one ethylenically-unsaturated bond and is copolymerizable with methyl methacrylate, may be mentioned, for example, such monomers as glycidyl methacrylate, beta-methylglycidyl methacrylate, N-glycidyl methacrylic amide, methacrylic acid addition products of epoxy resins composed respectively of polyhydric phenols and epihalohydrins, glycidyl acrylate, beta-methylglycidyl acrylate, N-glycidyl acrylic amide, acrylic acid addition products of epoxy resins composed respectively of polyhydric phenols and epihalohydrins, allyl glycidyl ether. These monomers may be used either singly or in combination.

The syrup ($B_1$) may be prepared from the monomers (d) and (e) by copolymerizing them to a polymerization degree of 10–60% under the same reaction conditions as those mentioned above in detail in connection with the production of the syrup (A) while using the same apparatus, catalyst and chain transfer agent as those mentioned above in detail in connection with the production of the syrup (A). Here again, any polymerization degrees smaller than 10% will result in moldings having poor water resistance while any polymerization degrees greater than 60% will lead to highly viscous syrups having very poor workability.

As the acrylic or methacrylic copolymer (f) which is contained in the syrup ($B_2$) in this invention and has glycidyl groups, there is used a copolymer obtained /by copolymerizing 3–97 wt.% of the monomer having one or more glycidyl groups and 97–3 wt.% of the monomer copolymerizable with the glycidyl-containing monomer and having a number average molecular weight of 1,500–50,000. As examples of the monomer having one or more glycidyl groups, may be employed, for example, one or more of glycidyl methacrylate, glycidyl acrylate, beta-methylglycidyl methacrylate, beta-methylglycidyl acrylate, allyl glycidyl ether. As exemplary monomers copolymerizable with the glycidyl-containing monomer, may be used, for example, acrylates and methacrylates such as methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, benzyl acrylate, benzyl methacrylate, cyclohexyl acrylate, cyclohexyl methacrylate, 2-hydroxyethyl acrylate, 2-hydroxyethyl methacrylate, 2-hydroxypropyl acrylate, 2-hydroxypropyl methacrylate; fumarates such as butyl fumarate; maleates; and besides, acrylic acid, methacrylic acid, styrene, alpha-methylstyrene, vinyl acetate, acrylic amide, methacrylic amide, acrylonitrile, methacrylonitrile.

It is necessary that the amount of the glycidyl-containing monomer used in the acrylic or methacrylic copolymer having glycidyl groups be within the range of 3–97 wt.%. If the amount should be less than 3 wt.%, the resulting molding will have poor water resistance. On the other hand, any amount of the glycidyl-containing monomer in excess of 97 wt.% will tend to allow gel to occur upon polymerization. Therefore, it is not preferred to use the glycidyl-containing monomer in any amount outside the above-specified range. It is also required that the number average molecular weight of the acrylic or methacrylic copolymer containing glycidyl groups be within the range of 1,500–50,000. If it should be smaller than 1,500, the resulting molding will have poor water resistance. On the other hand, any values greater than 50,000 will lead to highly viscous syrups having poor workability. Therefore, any number average molecular weights outside the above-specified range are not preferred.

As the acrylic or methacrylic copolymer (f) which is contained in the syrup ($B_2$) in this invention and contains glycidyl groups, it is feasible to use such a known polymer as disclosed in Japanese Patent Publication No. 38617/1973, 15090/1977.

The acrylic or methacrylic copolymer (f) may for example be a copolymer obtained by copolymerizing an acrylate or methacrylate represented by the formula (I):

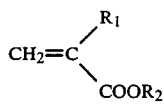

wherein $R_1$ means or $CH_3$ and $R_2$ denotes an alkyl group having 1–14 carbon atoms, with glycidyl acrylate or methacrylate represented by thwe formula (II):

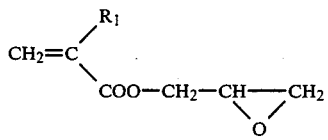

wherein $R_1$ means H or $CH_3$, and having a second order transition point of 5°–60° C. and a number average molecular weight of 1,500–30,000; or a copolymer obtained by copolymerizing a vinyl monomer such as a methacrylate or styrene, a glycidyl or methyl glycidyl acrylate or methacrylate represented by the formula (III):

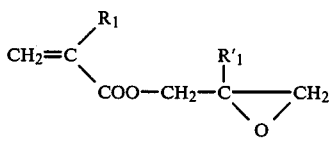

wherein $R_1$ and $R'_1$ mean individually H or $CH_3$, and a glycidyl or methyl glycidyl allyl or methallyl ether represented by the formula (IV):

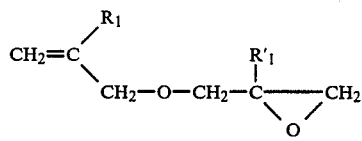

wherein $R_1$ and $R'_1$ denote individually H or $CH_3$, and having a softening point of 85°–105° C. and a number average molecular weight of 3,000–12,000.

On the other hand, as the monomer (g) which is contained in the syrup ($B_2$) in this invention and has at least one ethylenically-unsaturated bond and is copolymerizable with methyl methacrylate, it is possible to use any of those given above by way of example as the monomer (b), which is used in the syrup (A) and has reactivity with glycidyl groups, contains at least one ethylenically-unsaturated bond and is copolymerizable with methyl methacrylate, or those also given above in detail as examples of the monomer (c) which is also used in the syrup (A) of this invention, and does not have reactivity with glycidyl groups, contains at least one ethylenically-unsaturated bond and is copolymerizable with methyl methacrylate. In passing, among the compounds mentioned by way of example in connection with the monomer (b), hydroxyl-containing monomers are easiest for application as they do not tend to develop reactions, such as those causing viscosity increase along the passage of time, after dissolving the copolymer (f).

The syrup ($B_2$) can be obtained with ease by dissolving 5–95 wt.% of the above-specified, glycidyl-containing acrylic or methacrylic copolymer in 95–5 wt.% of the above-mentioned monomer, which contains the at least one ethylenically-unsaturated bond, in a tank equipped with a stirring device. If the content of the polymer should be less than 5 wt.%, the resulting molding will have poor water resistance. If it should exceeds 95 wt.% on the other hand, the resulting syrup ($B_2$) will have a viscosity which will be so high that some problems will arise as to its workability.

The methyl methacrylate syrup composition of this invention can be obtained by mixing 1–99 parts by weight of the syrup (A) obtained in the above manner with 99–1 parts by weight of the syrup ($B_1$) or ($B_2$), obtained also in the above-described manner, in such a way that the total amount becomes 100 parts by weight.

If the amount of the syrup (A) should be either less than 1 part by weight or greater than 99 parts by weight the water resistance of the resulting molding will be poor.

The following procedures may for example be followed for producing a molding from the syrup composition of this invention. Namely, the syrup (A) and the syrup ($B_1$) or ($B_2$) are mixed at the above-mentioned proportions in a tank equipped with a stirring device to obtain a syrup composition. To 100 parts of the thus-obtained syrup composition, were added 0.1–10 parts by weight of a catalyst such as azobisisobutyronitrile, benzoyl peroxide, t-butyl peroxyneodecanoate, t-butyl peroxypivalate, t-butyl peroxy-2-ethylhexanoate as well as 10–300 parts by weight of a filler such as glass fibers, siliceous sand, alumina to obtain a molding mixture. The molding mixture is then poured into a mold the inner wall of which has in advance been coated with a mold release agent such as silicone, polyvinyl alcohol or onto a release paper sheet such as polyester film, cellophane paper. Thereafter, the molding mixture is cured and molded at a temperature of 40°–120° C. over 20–200 minutes.

Certain embodiments of this invention will hereinafter be specifically described by the following Examples, in which all designation of "part" or "parts" will mean part or parts by weight.

PREPARATION EXAMPLE 1

[Preparation of Syrup (A)]

The following composition was charged in a flask equipped with a stirrer and was then caused to undergo a reaction at 103°–107° C. for 7 hours, thereby obtaining a syrup (A-1) having a polymerization degree of 31% and a viscosity of 520 cps. By the way, in all Examples inclusive of the subsequent Examples polymerization degrees were obtained from their corresponding refractive indexes.

| | | |
|---|---|---|
| Methyl methacrylate | 70.0 | parts |
| Styrene | 25.0 | parts |
| Trimethylolpropane trimethacrylate | 3.0 | parts |
| Methacrylic acid | 1.6 | parts |
| t-Dodecyl mercaptan | 0.1 | part |
| Azobisisobutyronitrile | 0.3 | part |
| TOTAL | 100.0 | parts |

PREPARATION EXAMPLE 2

[Preparation of Syrup (A)]

In the same manner as the Preparation Example 1, the following composition was reacted at 103°–107° C. for 12 hours to obtain a syrup (A-2) having a polymerization degree of 27% and a viscosity of 480 cps.

| | | |
|---|---|---|
| Methyl methacrylate | 70.0 | parts |
| Styrene | 25.0 | parts |
| Neopentylglycol dimethacrylate | 3.0 | parts |
| N—Methylaminoethyl methacrylate | 1.6 | parts |
| t-Dodecyl mercaptan | 0.1 | part |
| Azobisisobutyronitrile | 0.3 | part |
| TOTAL | 100.0 | parts |

PREPARATION EXAMPLE 3

[Preparation of Syrup ($B_1$)]

In the same manner as in Preparation Example 1, the following composition was reacted at 103°–107° C. for 10 hours to obtain a syrup ($B_1$-1) having a polymerization degree of 38% and a viscosity of 678 cps.

| | | |
|---|---|---|
| Methyl methacrylate | 54.0 | parts |
| Styrene | 23.0 | parts |
| Glycidyl methacrylate | 20.0 | parts |
| Trimethylolpropane trimethacrylate | 2.0 | parts |
| t-Dodecyl mercaptan | 0.2 | part |
| Azobisisobutyronitrile | 0.8 | part |
| TOTAL | 100.0 | parts |

PREPARATION EXAMPLE 4

[Preparation of Syrup ($B_1$)]

Following the procedures of Preparation Example 1, the following composition was reacted at 103°–107° C. for 14 hours to obtain a syrup ($B_1$-2) having a polymerization degree of 41% and a viscosity of 1520 cps.

| | | |
|---|---|---|
| Methyl methacrylate | 57.0 | parts |
| Styrene | 25.0 | parts |
| Methacrylic acid addition product of Epikote #828 (trade mark) | 15.0 | parts |
| Neopentylglycol dimethacrylate | 1.0 | part |
| t-Dodecyl mercaptan | 0.5 | part |
| Azobisisobutyronitrile | 1.5 | parts |
| TOTAL | 100.0 | parts |

(Note: The above Epikote #828 is a product of Yuka-Shell Epoxy K.K. and is an epoxy resin having an epoxy equivalent of 190. The synthesis of the methacrylic acid addition product of Epikote #828 was carried out by reacting Epikote #828 with methacrylic acid in an amount of 1 mole per every two moles of its epoxy groups, at 125–130° C. and in the presence of a tertiary amine.)

PREPARATION EXAMPLE 5

[Preparation of Syrup ($B_2$)]

In a flask similar to that employed in Preparation Example 1, was charged the following composition which consisted of monomers, polymerization initiator and solvent. The composition was heated at 110° C. for 8 hours to effect its polymerization. Then, the toluene was driven off with heating under reduced pressure, thereby obtaining a solid methacrylic copolymer (f) containing glycidyl groups. The number average molecular weight of the methacrylic copolymer (f) was 12,000.

| | | |
|---|---|---|
| Methyl methacrylate | 25.0 | parts |
| Styrene | 4.0 | parts |
| Glycidyl methacrylate | 10.0 | parts |
| Benzoyl peroxide | 1.0 | part |
| Toluene | 60.0 | parts |
| TOTAL | 100.0 | parts |

In 50.0 parts of the following monomer mixture (g), 50.0 parts of the above methacrylic copolymer (f) were dissolved to obtain a syrup ($B_2$-1) having a viscosity of 1750 cps.

| | | |
|---|---|---|
| Methyl methacrylate | 33.0 | parts |
| Styrene | 14.0 | parts |
| Trimethylolpropane trimethacrylate | 3.0 | parts |
| Monomer (g) TOTAL | 50.0 | parts |

PREPARATION EXAMPLE 6

[Preparation of Syrup ($B_2$)]

In a flask similar to that employed in Preparation Example 1, was charged the following composition which consisted of monomers, polymerization initiator and solvent. The composition was heated at 110° C. for 8 hours to effect its polymerization. Thereafter, the toluene was driven off with heating under reduced pressure to obtain a solid methacrylic copolymer (g) containing glycidyl groups. The number average molecular weight of the methacrylic copolymer (g) was 7,000.

| | | |
|---|---|---|
| Methyl methacrylate | 20.0 | parts |
| Styrene | 5.0 | parts |
| n-Butyl methacrylate | 5.0 | parts |
| Glycidyl methacrylate | 8.5 | parts |
| Benzoyl peroxide | 1.5 | parts |
| Toluene | 60.0 | parts |
| TOTAL | 100.0 | parts |

In 50.0 parts of the following monomer composition (g), 50.0 parts of the above methacrylic copolymer (f) were dissolved to obtain a syrup ($B_2$-2) having a viscosity of 1,300 cps.

| | | |
|---|---|---|
| Methyl methacrylate | 33.0 | parts |
| Styrene | 11.0 | parts |
| 2-Hydroxyethyl methacrylate | 3.0 | parts |
| Trimethylolpropane trimethacrylate | 3.0 | parts |
| Monomer (g) TOTAL | 50.0 | parts |

PREPARATION EXAMPLE 7

[Preparation of Syrup (C) for the Sake of Comparison]

Similar to Preparation Example 1, the following composition was reacted at 103°–107° C. for 6 hours to obtain a syrup (C) having a polymerization degree of 26% and a viscosity of 320 cps. The syrup (C) had poor storage stability and its viscosity increased to gel ten days later at 20° C.

| | | |
|---|---|---|
| Methyl methacrylate | 55.0 | parts |

-continued

| | | |
|---|---:|---|
| Styrene | 23.0 | parts |
| Glycidyl methacrylate | 20.0 | parts |
| Methacrylic acid | 1.6 | parts |
| t-Dodecyl mercaptan | 0.1 | part |
| Azobisisobutyronitrile | 0.3 | part |
| TOTAL | 100.0 | parts |

EXAMPLES 1–7 AND COMPARATIVE EXAMPLES 1–4

Syrup compositions (Examples 1–7) of this invention were obtained by mixing the syrups, which had been prepared in the above Preparation Examples, in proportions given in Table 1. These syrup compositions as well as comparative syrups (C), (A-1), (B₁-1) and (B₂-1) (Comparative Examples 1–4) were individually cured under conditions given in Table 1 to obtain moldings. Furthermore, 70 parts of siliceous sand were mixed with 30 parts of each of the syrup compositions of the formulations given in Table 1 and their syrups. Thereafter, the resultant mixture was poured into a stainless or aluminum mold coated with such as mold release agent as silicone, polyvinyl alcohol, followed by its curing under the curing conditions shown in Table 1. The syrup compositions and syrups gave respectively moldings having good surface gloss. The boiling water resistance (16 hours immersion in boiling water) of the thus-obtained moldings are shown in Table 2. As apparent from Table 2, it is clearly envisaged that by causing functional groups having reactivity with glycidyl groups to undergo an addition reaction with glycidyl groups concurrently with the radical polymerization, the moldings produced from the syrup compositions of this invention have been leapingly improved in water resistance under severe conditions.

TABLE 1

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| Formulation of syrup composition | | | | | | | | | | | |
| Syrup (A-1) | 49.5 | 49.5 | — | 49.5 | 49.5 | — | — | — | 99.0 | — | — |
| Syrup (A-2) | — | — | 49.5 | — | — | 49.5 | 49.5 | — | — | — | — |
| Syrup (B₁-1) | 49.5 | — | 49.5 | — | — | — | — | — | — | 99.0 | — |
| Syrup (B₁-2) | — | 49.5 | — | — | — | — | — | — | — | — | — |
| Syrup (B₂-1) | — | — | — | 49.5 | — | 49.5 | — | — | — | — | 99.0 |
| Syrup (B₂-2) | — | — | — | — | 49.5 | — | 49.5 | — | — | — | — |
| Syrup (C) | — | — | — | — | — | — | — | 99.0 | — | — | — |
| Curing conditions | | | | | | | | | | | |
| t-Butyl peroxyneodecanoate | 1.0 | 1.0 | 1.0 | 1.0 | 1.0 | 1.0 | 1.0 | 1.0 | 1.0 | 1.0 | 1.0 |
| Curing Temp. (°C.) | 70 | 70 | 70 | 70 | 70 | 70 | 70 | 70 | 70 | 70 | 70 |
| Curing Time (hr.) | 1 | 1 | 1 | 1 | 1 | 1 | 1 | 1 | 1 | 1 | 1 |

Note: All proportions are expressed in terms of parts by weight.

TABLE 2

| ** | Transparent molding* | Molding filled with siliceous sand* |
|---|---|---|
| Ex. 1 | No changes | No changes |
| Ex. 2 | No changes | No changes |
| Ex. 3 | No changes | No changes |
| Ex. 4 | No changes | No changes |
| Ex. 5 | No changes | No changes |
| Ex. 6 | No changes | No changes |
| Ex. 7 | No changes | No chnages |
| Comp. Ex. 1 | No changes | Delustered |
| Comp. Ex. 2 | Whitened | Delustered |
| Comp. Ex. 3 | Whitened | Delustered |
| Comp. Ex. 4 | Whitened | Delustered |

Note:
*Molding
**Syrup composition or syrup

We claim:

1. A methyl methacrylate syrup composition comprising an intimate mixture of 1–99 parts by weight of a first polymer-in-monomer syrup (A) and 99–1 parts by weight of a second polymer-in-monomer syrup which can be either (B₁) or (B₂), the sum of said first syrup (A) and said second syrup (B₁) or (B₂) being 100 parts by weight, wherein said syrups (A), (B₁) and (B₂) are as folows:

(A) a polymer-in-monomer syrup obtained by copolymerizing to a polymerization degree of 10–60% a mixture which comprises (a) 5–95 wt. % of methyl methacrylate monomer, (b) 95–1 wt. % of one or more monomers having reactivity with glycidyl groups, containing at least one ethylenically-unsaturated bond, being co-polymerizable with methyl methacrylate, and selected from the group consisting of:

(i) carboxyl-containing monomers, said carboxyl-containing monomers themselves being selected from the group consisting of methacrylic acid, maleic anhydride, maleic acid, fumaric acid and acrylic acid;

(ii) hydroxyl-containing alkyl (meth)acrylate monomers;

(iii) phosphorous- or phosphoric-containing acrylic ester monomers; and (iv) amino-containing monomers, said amino-containing monomers themselves being selected from the group consisting of N-methyl-aminoethyl methacrylate, 4-N-methyl-aminocyclohexyl methacrylate, N,N-dimethylaminoethyl methacrylate, methacrylic amide, crotonic amide, vinyl amine, N-ethylvinyl amine, allyl amine, diallyl amine, N-methylallyl amine, N-methylaminoethyl acrylate, 4-N-methyl-aminocyclohexyl acrylate, N,N-dimethylaminoethyl acrylate and acrylic amide; and (c) 0–94 wt. % of one or more monomers not having reactivity with glycidyl groups, containing at least one ethylenically-unsaturated bond, being copolymerizable with methyl methacrylate and selected from the group consisting of (meth)acrylates, styrene and styrene derivatives, the sum of said monomers (a), (b) and (c) being 100 wt. %;

(B$_1$) a polymer-in-monomer syrup obtained by copolymerizing to a polymerization degree of 10–60% a mixture which comprises (d) 3–97 wt.% of one or more monomers containing at least one glycidyl group and at least one ethylenically-unsaturated bond, being copolymerizable with methyl methacrylate and selected from the group consisting of glycidyl (meth)acrylates, beta-methylglycidyl (meth)acrylates, N-glycidyl (meth)acrylic amides, (meth)acrylic acid addition products of an epoxy resin composed of a polyhydric phenol and an epihalohydrin and allyl glycidyl ether and (e) 97–3 wt. % of one or more monomers selected from the group consisting of methyl methacrylate and the monomers defined in sub-paragraph (c) above, the sum of said monomers (d) and (e) being 100 wt. %;

(B$_2$) a polymer-in-monomer syrup containing (f) 5–95 wt. % of a copolymer obtained by copolymerizing 3–97 wt. % of one or more monomers containing at least one glycidyl group and selected from the group consisting of glycidyl (meth)acrylates, beta-methylglycidyl (meth)acrylates and allyl glycidyl ether and 97–3 wt. % of one or more other copolymerizable monomers selected from the group consisting of (meth)acrylates, fumarates, maleates, styrene, alpha-methylstyrene, (meth)acrylic amide and (meth)acrylonitrile, having a number average molecular weight of 1,500–50,000 and containing a glycidyl group, in (g) 95–5 wt. % of one or more monomers selected from the group consisting of methyl methacrylate and the monomers defined in sub-paragraph (c) above.

2. A syrup composition as claimed in claim 1, comprising 1–99 parts by weight of the syrup (A) and 99–1 parts by weight of the syrup (B$_1$).

3. A syrup composition as claimed in claim 1, comprising 1–99 parts by weight of the syrup (A) and 99–1 parts by weight of the syrup (B$_2$).

4. A molding obtained by radical polymerizing the syrup composition of claim 1.

5. A molding obtained by radical polymerizing the syrup composition of claim 2.

6. A molding obtained by radical polymerizing the syrup composition of claim 3.

* * * * *